(12) United States Patent
Hambir

(10) Patent No.: US 9,087,354 B1
(45) Date of Patent: Jul. 21, 2015

(54) ORDERING CHECKS USING A MOBILE DEVICE

(75) Inventor: Santosh V. Hambir, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 682 days.

(21) Appl. No.: 13/306,778

(22) Filed: Nov. 29, 2011

(51) Int. Cl.
G06Q 30/00 (2012.01)
G06Q 30/06 (2012.01)

(52) U.S. Cl.
CPC .................................. *G06Q 30/0601* (2013.01)

(58) Field of Classification Search
CPC ... G06Q 20/042; G06Q 20/108; G06Q 20/40; G06Q 20/4016; G06Q 20/3224; G06Q 30/00
USPC ............................................ 705/35, 42, 26.1
See application file for complete search history.

(56) References Cited

U.S. PATENT DOCUMENTS

| | | | | |
|---|---|---|---|---|
| 7,283,981 B2* | 10/2007 | Solem | .............................. | 705/42 |
| 7,873,200 B1* | 1/2011 | Oakes et al. | ................... | 382/137 |
| 8,474,707 B2* | 7/2013 | Ramachandran | ............. | 235/380 |
| 2005/0097046 A1* | 5/2005 | Singfield | ........................ | 705/42 |
| 2008/0159655 A1* | 7/2008 | Breeden | ......................... | 382/306 |
| 2008/0249951 A1* | 10/2008 | Gilder et al. | ..................... | 705/76 |
| 2012/0292389 A1* | 11/2012 | Ramachandran | ............. | 235/379 |

OTHER PUBLICATIONS

Stellin, Susan, Bank will alow customers to deposit check by iPhone, Aug. 10, 2009, New York Times, see entire document.*
Online Check Deposit, Sep. 2008, Suntrust Bank—Check Standards and Troubleshooting Guide, pp. 1-7.*

* cited by examiner

*Primary Examiner* — Courtney Stopp
(74) *Attorney, Agent, or Firm* — Osha • Liang LLP (57) ABSTRACT

A method to order a set of paper checks using a mobile device, including obtaining, using the mobile device, an image of a check, analyzing, using a computer processor of the mobile device and based on a pre-determined check template, the image to generate account information of the check, wherein the account information relates to a checking account of an account holder at a financial institution issuing the check, and wherein the account information comprises a checking account number, a name of the account holder, and an address of the account holder, searching, using the computer processor, a database to identify a check ordering service based on the account number and the address of the account holder, and submitting to the check ordering service, using the mobile device, an order of the set of paper checks for the account holder based on the account information of the account holder.

22 Claims, 10 Drawing Sheets

ORDERING CHECKS USING A MOBILE DEVICE

BACKGROUND

A check is a negotiable instrument instructing a financial institution to pay a specific amount of a specific currency from a specified transactional account held in the account holder's name with that financial institution. Typically, the transactional account is a checking account with a bank where the account holder's fund was previously deposited. As such, a check is a document (such as a piece of paper) that orders a payment of fund (i.e., money) from the checking account. Throughout this disclosure, the term "check" specifically refers to a paper check. Since the check is used to withdraw the fund for making a payment, the account holder is referred to as the drawer or payer. The check usually includes imprinted information such as bank and checking account details, payer's name and contact information (e.g., address, phone number, etc.), as well as a template order to pay fund. The payer, or an authorized third party, writes various payment details (e.g., amount, date, and a payee) on the check where the payer signs to create an executed check. Prior to the check being written with such payment details and signature, it is referred to as an unused check or a blank check. Essentially, the template order imprinted on the unused check to pay fund becomes a specific order on the executed check for the payer's bank, referred to as the drawee, to pay the payee the amount of money written on the check. Both the payer and payee may be natural persons or legal entities.

Unused checks may be issued (i.e., provided) to the payer by the financial institution where the checking account is held, or by other check ordering services. The conventional way of ordering checks is time-consuming, and error-prone.

SUMMARY

In general, in one aspect, the invention relates to a method to order a set of paper checks using a mobile device. The method includes obtaining, using the mobile device, an image of a check, analyzing, using a computer processor of the mobile device and based on a pre-determined check template, the image to generate account information of the check, wherein the account information relates to a checking account of an account holder at a financial institution issuing the check, and wherein the account information comprises a checking account number, a name of the account holder, and an address of the account holder, searching, using the computer processor, a database to identify a check ordering service based on the account number and the address of the account holder, and submitting to the check ordering service, using the mobile device, an order of the set of paper checks for the account holder based on the account information of the account holder.

In general, in one aspect, the invention relates to a system to order a set of paper checks. The system includes a server of a check ordering service configured to process an order of the set of paper checks and mobile device coupled to the server of the check ordering service server via a mobile network. The mobile device includes a camera configured to capture an image of a check, a processor and memory storing instructions, when executed by the processor, include functionalities to analyze the image to generate account information of the check based on a pre-determined check template, wherein the account information relates to a checking account of an account holder at a financial institution issuing the check, and wherein the account information comprises a checking account number, a name of the account holder, and an address of the account holder, search a database to identify the check ordering service based on the account number and the address of the account holder, and submit, to the server of the check ordering service, an order of the set of checks for the account holder based on the account information of the account holder, and a repository configured to store the image of the check.

In general, in one aspect, the invention relates to a non-transitory computer readable medium storing instructions to order a set of checks. The instructions, when executed by a computer processor of a mobile device, include functionality to obtain, using a camera of the mobile device, an image of a check, analyze, based on a pre-determined check template, the image to generate account information of the check, wherein the account information relates to a checking account of an account holder at a financial institution issuing the check, and wherein the account information comprises a checking account number, a name of the account holder, and an address of the account holder, search a database to identify a check ordering service based on the account number and the address of the account holder, and submit, to the check ordering service, an order of the set of paper checks for the account holder based on the account information of the account holder.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention allow a user to order checks from a check ordering service (e.g., operated by a bank or other third party service provider) using a mobile device, such as a smartphone. The user is a user of the mobile device and software applications installed on the mobile device, who may be the payer of the check (i.e., the account holder of the checking account) or a third party authorized by the payer of the check. In particular, the user uses the mobile device to order checks (e.g., a book of checks referred to as a checkbook) without manually entering any user data (e.g., bank/account information, payer information, etc. to be included in the check imprint information) during the check ordering process. Such automated check ordering process reduces human errors that may cause rerun or rework by the check ordering service.

In one or more embodiments, camera & GPS capabilities of the smartphone or other mobile device are used in the check ordering process to minimize data entry and user inputs thereby delivering expedient, error-free, and more secure way to order checks. For example, an image of a blank and/or voided check captured by the camera of the smartphone is used to obtain required user data to order the check while current user location obtained from the GPS of the smartphone is used to verify the payer address to be imprinted on the check and/or select a convenient (e.g., local) check ordering service for submitting the order.

Figure 1:
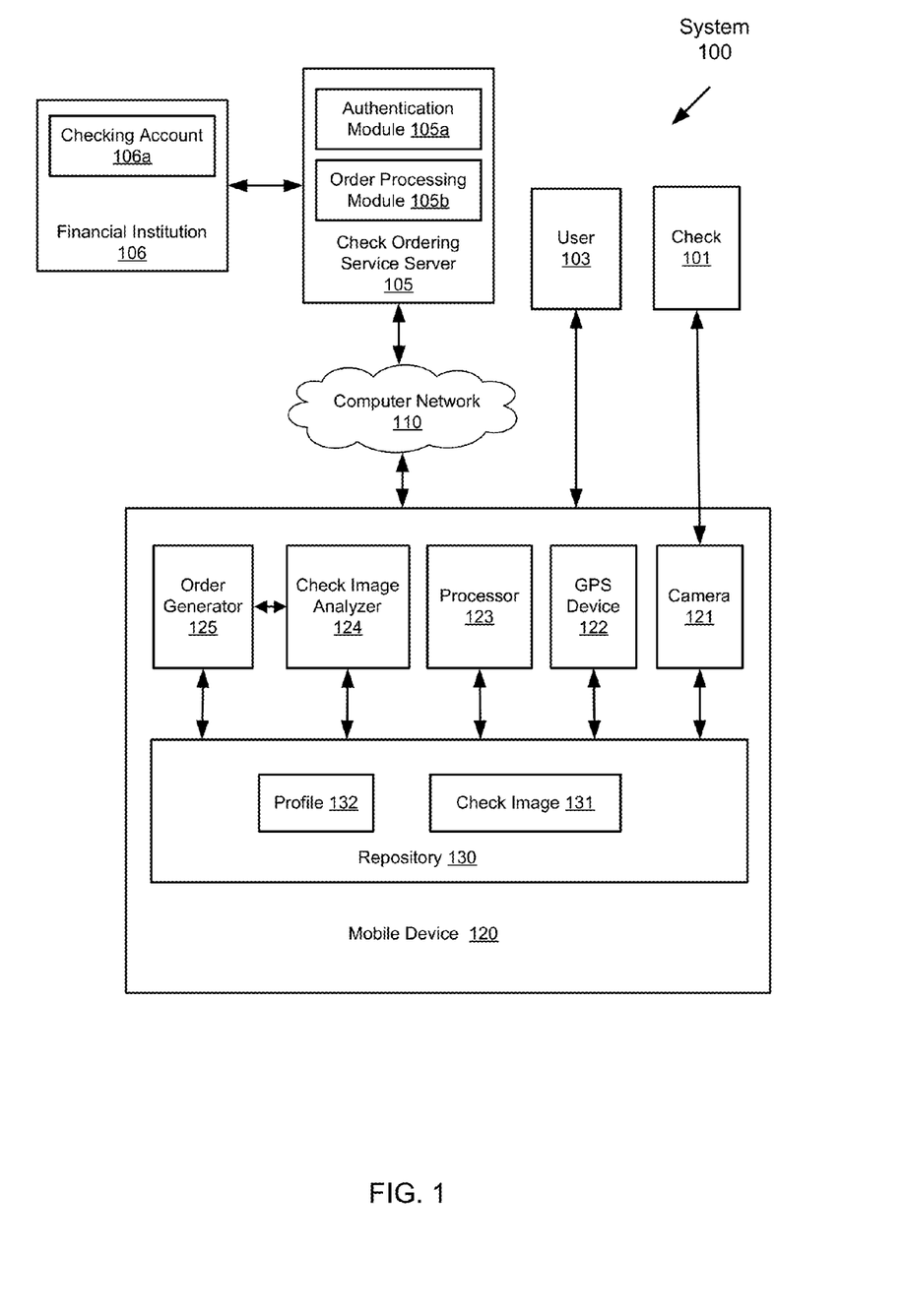
FIG. 1 shows a schematic diagram of a system of ordering checks using a mobile device in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a check ordering system in accordance with embodiments disclosed herein.

As shown in FIG. 1, the system (100) includes check (101), user (103), mobile device (120) of the user (103), financial institution (106), and check ordering service server (105). As shown, the check ordering service server (105) and mobile device (120) are coupled via computer network (110). For example, the computer network (110) may include a wireless communication network (e.g., a mobile phone network) and wired and/or wireless portions of the Internet and/or other data communications networks such as wide area networks (WANs), local area networks (LANs), etc. Further, the mobile device (120) includes camera (121), GPS device (122), processor (123), and is configured to execute check image analyzer (124) and order generator (125). The check image analyzer (124) and order generator (125) may be software applications installed onto the mobile device (120).

The mobile device (120) includes repository (130) operatively coupled to the camera (121), GPS device (122), processor (123), check image analyzer (124), and order generator (125). In one or more embodiments, the repository (130) is a persistent storage device (or set of devices) configured to store a check image (131) and a profile (132) of the user (103), as well as other data for use by the check image analyzer (124) and order generator (125). The repository (130) (and/or any portion of data items stored therein) may be a data store such as a database, a file system, one or more data structures (e.g., arrays, link lists, tables, hierarchical data structures, etc.) configured in a memory, an extensible markup language (XML) file, any other suitable medium for storing data, or any suitable combination thereof. The repository (130), or a portion thereof, may be a device internal to the mobile device (120) or an external storage device operatively connected to (e.g., wirelessly coupled with, mechanically plugged into, etc.) the mobile device (120).

In one or more embodiments of the invention, the check (101) may be an unused check, an executed check, or a voided check. For example, the unused check or executed check may be voided by writing a line across the face of the check to void the template order or specific order to pay fund. Generally, the check (101) has a payer (not shown) who is a natural person or an entity (e.g., a company, a business entity, or other legal entity) holding the checking account (106a) with the financial institution (106). In particular, the check (101) is a previously issued check of the checking account (106a), of which the account holder is the payer of the check (101). In an example, the user (103) is a natural person payer of the check (101) who orders additional checks for himself/herself. In another example, the user (103) is another person authorized by the payer of the check (101) to order additional checks on behalf of the payer of the check (101). In yet another example, the user (103) is an authorized person (e.g., owner, employee, or other representative) of a non-person entity payer of the check (101) to order additional checks on behalf of the non-person entity payer.

In one or more embodiments of the invention, the system (100) includes the check ordering service server (105) that is configured to process an order of a new set of paper checks. The new set of paper checks may be a checkbook of the checking account (106a) having the same payer as the check (101). In particular, the imprinted information on each check of the checkbook is based on the account information and payer information imprinted on the check (101). In one or more embodiment, the order is submitted by the user (103) using the mobile device (120).

As shown in FIG. 1, the check ordering service server (105) includes authentication module (105a) that is configured to validate authentication information prior to processing the order. In one or more embodiments, the authentication information is submitted with the order to authenticate that the user (103) is properly authorized to order the new set of paper checks, as evidenced by possession of such authentication information by the user (103). For example, such authentication information may include user name, password, initial account set up location, etc. associated with the checking account (106a).

In one or more embodiment, the check ordering service server (105) includes order processing module (105b) that is configured to process the order of the new set of paper checks. For example, processing the order may include scheduling the printing, shipping, and other handling of the new set of paper checks. Further, processing the order may also include providing status information of the printing, shipping, and other handling of the new set of paper checks in response to an inquiry by the user (103).

In one or more embodiment, the check ordering service server (105) is operated by the financial institution (106). In one or more embodiment, the check ordering service server (105) is operated by a third party provider contracted by, authorized by, or otherwise associated with the financial institution (106) to process the order of checks for checking accounts (e.g., checking account (106a)) held with the financial institution (106). In one or more embodiment, the check ordering service server (105) is operated by a third party provider independent of the financial institution (106).

In one or more embodiments of the invention, the system (100) includes the mobile device (120) that is configured to generate and submit the aforementioned order of the new set of paper checks. Although not explicitly shown in FIG. 1, the mobile device (120) includes user interface means (e.g., display screen, physical or virtual keyboard, microphone, speaker, etc.) for interacting with the user (103) to generate the order, as well as data communication means (e.g., wireless communication circuits) for submitting the order. For example, the mobile device (120) may generate the order as requested by the user (103). Further, the mobile device (120) may submit the order via a mobile communication network (e.g., a cellular phone network or other wireless communication network) to which the check ordering service server (105) is coupled directly, or indirectly via the Internet through a gateway to such mobile communication network. As shown in FIG. 1, the computer network (110) may include one or more of such mobile communication network, cellular phone network, wireless communication network, a portion of the Internet, and the gateway device attached thereto. In one or more embodiments, the order of the new set of paper checks may be submitted from the mobile device (120) to the check ordering service server (105) in a secured message, data file, or other suitable forms of data transmission. For example, the secured message may be a text message, an email, or other forms of message with appropriate encryption or other secured data transmission arrangement known to those skilled in the art.

In one or more embodiments of the invention, the mobile device (120) includes the camera (121) that is configured to capture an image of a check (e.g., check (101)) to be stored in the repository (130) as the check image (131). For example, the check image (131) is a picture of the face of the check (101) and represents the imprinting on the check (101) as image data contained in the check image (131).

In one or more embodiments of the invention, the mobile device (120) includes the GPS device (122) that is configured to obtain a current location of the mobile device (120) and the user (103). Such current location information may be used for security purposes or to select a convenient check ordering service provider, as described below.

In one or more embodiments of the invention, the mobile device (120) includes the check image analyzer (124) that is configured to analyze the check image (131) to generate account information of the check (101) based on a pre-determined check template. As noted above, the account information is imprinted on the check (101) and relates to the checking account (106a). Typically, the account information includes an account number as well as an account holder's name, address, phone number, and/or other contact information. Further, the account information may also include a bank routing number and an address of the financial institution (106). In one or more embodiments, such account information is retrieved from the check image (131) using optical character recognition (OCR) techniques performed by the check image analyzer (124). In one or more embodiments, as described below, the check image analyzer (124) analyzes the check image (131) to retrieve account information in response to a notification from, and for providing the account information to, the order generator (125).

In one or more embodiments, the aforementioned pre-determined check template includes information describing the layout format of the imprinting on the check (101). In particular, the pre-determined check template may describe particular field locations or sequences of account number, account holder's name, address, phone number, bank routing number, bank address, etc imprinted on the check (101). For example, the account holder's name, address, and phone number are typically located at the upper left corner of a check (e.g., check (101)) in sequential rows while the account number is typically located near the bottom of the check. In another example, the format of the account number typically includes a fix number of digits (e.g., a nine digit number). In one or more embodiments, the aforementioned pre-determined check template includes information describing keywords commonly found in the imprinting on the check (101). Such keywords may include "street," "St," "apartment," "apt," "telephone," "tel," "pay to the order of," "date," etc. that are used in conjunction with the OCR techniques to identify or isolate portions of the account information, such as the address, telephone number, account number, etc. In one or more embodiments, the pre-determined check template is automatically identified by the check image analyzer (124) from multiple templates describing common layout formats of checks (e.g., check (101)). For example, such identification may be based on a best match found in one of these multiple templates to the check image (131).

In one or more embodiment, the check image analyzer (124) is further configured to determine that the check (101) is unused based on analyzing the check image (131). For example, the aforementioned pre-determined check template may describe fields containing imprinted information (e.g., account holder name, account number, etc.) as well as other fields (e.g., check amount, date, payer signature, memo, etc.) to be written by the payer of the check (e.g., check (101)). Accordingly, the check (101) is determined to be unused if fields to be written by the payer is found to contain only blank characters based on the OCR techniques. Similarly, the check (101) may be determined to be an executed check or a voided check by analyzing the check image (131) based on various pre-determined criteria. For example, the check (101) may be determined to be an executed check if non-blank characters are detected in one or more fields designated to be written by the payer of the check (e.g., check (101)). In another example, the check (101) may be determined to be a voided check if a written line is detected across the face of the check (e.g., check (101)).

In one or more embodiments of the invention, the mobile device (120) includes the order generator (125) that is configured to generate the aforementioned order of the new set of paper checks. In one or more embodiments, such order is generated in response to a user request and subject to authentication and other qualifying criteria.

In one or more embodiments, the order generator (125) is configured to receive a request from the user (103) to initiate the order of the new set of paper checks. For example, the request may be received when the user (103) activates a key in a keyboard (not shown) of the mobile device (120) or an action button displayed on the mobile device (120). Further, the keyboard may be a physical keyboard included on the mobile device (120) or a virtual keyboard displayed on a screen (not shown) of the mobile device (120).

In response to receiving the request from the user (103), the order generator (125) is configured to present a message prompting the user (103) to capture an image of an existing check (e.g., check (101)) for supplying information to be imprinted on the new checks. In one or more embodiments, the prompt includes a visual message displayed on the screen of the mobile device (120). In one or more embodiments, the prompt includes an audible message delivered using the speaker of the mobile device (120). In one or more embodiments, the prompt instructs the user (101) to capture the image by locating an existing check (e.g., check (101)) and directing the camera (121) to aim at the face of the existing check for taking a picture. In one or more embodiments, the picture taken by the camera (121) is stored as the check image (131). As noted above, in response to storing the check image (131), the order generator (125) notifies the check image analyzer (124) to analyze the check image (131) and provide account information to be imprinted on the new set of paper checks.

In one or more embodiments, the order generator (125) is configured to submit an order of the new set of paper checks to the check ordering service server (105) based on the account information provided by the check image analyzer (124). For example, the account information retrieved from the check image (131) is included in the order to specify imprinted information on the new set of checks to be the same as those imprinted on the check (101), which correspond to the account number, account holder's name, address, phone number, etc. of the checking account (106a).

In one or more embodiments, the account information retrieved from the check image (131) is modified based on user inputs before being included in the order to specify imprinted information on the new set of checks to be a variation of those imprinted on the check (101). In such embodiments, the order generator (125) is configured to prompt the user (103) to specify such modification. For example, the user (103) may specify the format, style, size, etc. of various fields to be imprinted on the new set of paper checks to be modified from those imprinted on the check (101). In another example, the user (103) may specify corrections or other types of modification to the account information retrieved from the check image (131) before it is included in the order of the new set of paper checks.

In one or more embodiments, the order generator (125) is configured to obtain additional information required to complete the order of the new set of paper checks. Such additional information may include style (e.g., person check style, business check style, with or without carbon copies, etc.) of the checks, background graphics of the checks, starting check number of the checks, delivery address of the checks, payment information for paying for the order, etc. In one or more embodiments, some of such additional information may be automatically extracted from the check image (131) or obtained from the user.

As noted above, submitting the order may be subject to authentication and other qualifying criteria. In one or more embodiments, the order the new set of paper checks is authenticated based on a profile (132) of the user (103) stored in the repository (130). For example, the profile (132) may include one or more of name, address, phone number, account number, etc. of the user (103) that are matched to those associated with the checking account (106a) and/or retrieved from the check image (131). Once matched, the user (103) is identified as, or considered to be authorized by, the account holder of the checking account (106a) and/or the payer of the check (101) to authenticate the order. In another example, the profile (132) may include pre-assigned user name, password, etc. that are matched to those of a check ordering account (not shown) held at the check ordering service server (105) and associated with the checking account (106a). Once matched, the user (103) is identified as, or considered to be authorized by, the account holder of the checking account (106a) and/or the payer of the check (101) to authenticate the order. In one or more embodiments, the order generator (125) is configured to retrieve authentication information from the profile (132) and send the authentication information to the check ordering service server (105) for authentication when submitting the order. In one or more embodiments, the order generator (125) is configured to evaluate the authentication information retrieved from the profile (132) to authenticate the order prior to submitting to the check ordering service server (105).

In one or more embodiments, the request to order the new set of paper checks is authenticated based on a current location of the user (103) as determined by the GPS device (122). For example, the order of the new set of paper checks is restricted to be submitted within a same geographical location (e.g., same city, county, state, country, etc.) as the account holder's address of the checking account (106a). In one or more embodiments, the order generator (125) is configured to compare the current location provided by the GPS device (122) to the address information provided by the check image analyzer (124) to authenticate the order.

For security purposes, the order may be qualified by requiring that the check image (131) is captured from a particular type of check. In one or more embodiments, the order generator (125) is configured to further qualify the order of the new set of paper checks based on the determination that the check (101) is an unused check. For example, such determination may be made by the check image analyzer (124) by analyzing the check image (131) and provided to the order generator (125). In other embodiments, the order may be qualified based on the check (101) being a voided check, as determined by the check image analyzer (124) and provided to the order generator (125). For example, the message presented to the user (101) by the order generator (125) instructing the user (103) to locate the existing check (101) for image capturing may specify that the check (101) needs to be an unused check (whether voided or not), a voided check (whether unused or not), an unused and voided check, or other suitable conditions.

In one or more embodiments, the order generator (125) is configured to identify the account holder's address retrieved from the check image (131) to be included in the order as the ship-to address for delivering the new set of paper checks. In one or more embodiments, the order generator (125) is configured to receive an address from the user (101) to be included in the order as the ship-to address for delivering the new set of paper checks. In one or more embodiments, the order generator (125) is configured to retrieve an address from the profile (132) to be included in the order as the ship-to address for delivering the new set of paper checks.

In one or more embodiments, once the order for the new set of paper checks is generated, authenticated, and qualified, the order generator (125) is further configured to search a database (not shown) to identify the check ordering service server (105). For example, the order generator (125) may identify the financial institution (106) based on the account number and the address of the account holder retrieved from the check image (131) by the check image analyzer (124). Accordingly, a check ordering service, and the corresponding check order service server (105), associated with (e.g., contracted with or otherwise authorized by) the identified financial institution (106) is selected from the database. In another example, the order generator (125) may identify a local (e.g., in the same city, county, state, country, etc.) check ordering service, and the corresponding check order service server (105), based on a current location of the user (103) to minimize the shipping cost.

In one or more embodiments of the invention, the mobile device (120) includes the processor (123) that is configured to execute software instructions, such as those contained in the check image analyzer (124), order generator (125), or otherwise included in the mobile device (120) to control the camera (121), GPS device (122), and perform various tasks of generating and submitting the order of the new set of paper checks.

Figure 2:
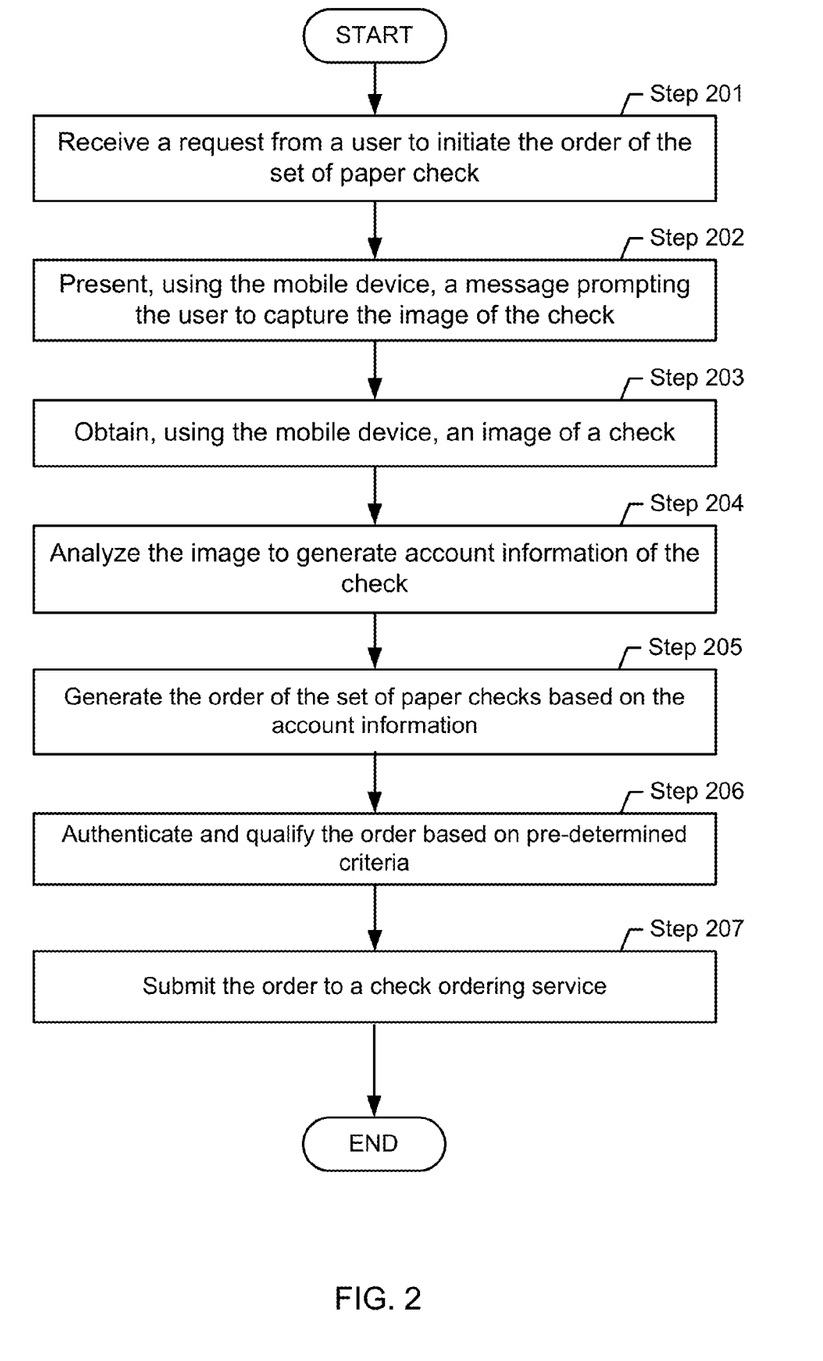
FIG. 2 shows a flowchart of a method of ordering checks using a mobile device in accordance in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100) described in reference to FIG. 1 above.

In one or more embodiments, method steps described below are performed by a check ordering software application executing on a computer processor of a mobile device (e.g., a smartphone) to order a new set of paper checks based on a camera image of an existing check such that a user's manual inputs are minimized. In particular, the new set of paper checks and the existing check are related to a checking account held with a financial institution, such as a bank. The user of the mobile device ordering the new set of paper checks may be the account holder of the checking account (i.e., the payer of the paper checks) or another person authorized by such account holder.

Initially in Step 201, a request is received from a user to initiate the order of the set of paper checks. For example, the request is received by the mobile device of the user via a physical keyboard or touch-screen action button of the mobile device.

In Step 202, a message is presented to the user using the mobile device to prompt the user to capture an image of the face of an existing check. For example, the message may include a visual instruction displayed on a screen of the mobile device and/or an audible instruction presented using a speaker of the mobile device. Specifically, the message may instruct the user to point a camera of the mobile device toward the face of the existing check and take a picture. For example, the message may instruct the user to take the picture using a general feature of the mobile device. In another example, the message may instruct the user to take the picture using a dedicated action button of the check ordering software application. Further, the message may require the user to use an existing check that meets certain criteria, such as an unused check, a voided check, an unused and voided check, or other suitable qualifying conditions.

In Step 203, an image of the existing check is obtained using the mobile device, more specifically using the camera on the mobile device. For example, the image may be captured using a general feature of the mobile device activated by the user as instructed. In another example, the image may be captured using a dedicated action button of the check ordering software application activated by the user as instructed.

In Step 204, the captured image of the existing check is analyzed to generate account information of the existing check. In one or more embodiments, the image is analyzed based on a pre-determined check template that describes a particular layout format of the imprinted account information on the existing check. For example, the imprinted account information may include various fields such as a checking account number, a name of the account holder, an address of the account holder, etc. Further, the account holder's (i.e., check payer's) name, address, phone number, etc. may be specified in the pre-determined check template as located at a top left corner of the check while the account number is specified as located near the bottom of the check. Accordingly, various fields in the imprinted account information may be retrieved from the captured image using OCR techniques with the assistance of the pre-determined check template. In one or more embodiments, the pre-determined check template may be selected from a collection of templates that produces a best match when applied to the captured check image using the OCR techniques.

In Step 205, the order for the new set of paper checks is generated based on the account information generated in Step 204 above. For example, the order includes the information to imprint on the face of the new set of paper checks, such as the checking account number, the account holder's (i.e., the check payer's) name, address, phone number, etc. that are generated in Step 204 above. In one or more embodiments, such information may be modified by the user before included in the order. For example, the user may specify the format, style, size, etc. of various fields to be imprinted on the new set of paper checks to be modified from those imprinted on the existing check. In another example, the user may specify corrections or other types of modification to the account information retrieved from the check image before it is included in the order of the new set of paper checks.

In addition, the order may include other information such as style (e.g., person check style, business check style, with or without carbon copies, etc.) of the checks, background graphics of the checks, starting check number of the checks, delivery address of the checks, payment account of the checks, etc. Some of such additional information may be automatically extracted from the captured check image or obtained from the user. For example, the account holder's address in the account information extracted from the check image may be used as the ship-to address where the ordered checks will be delivered to. In another example, the ship-to address may be received from the user or retrieved from a profile of the user that is stored in the mobile device.

In Step 206, the order generated in Step 205 is authenticated and qualified. In one or more embodiments, the order the new set of paper checks is authenticated based on a profile of the user stored in the mobile device. For example, the profile may include name, address, phone number, account number, etc. of the user that are matched to those associated with the checking account as retrieved from the check image. Once matched, the user is identified as, or considered to be authorized by, the account holder of the checking account (i.e., the payer of the check) to authenticate the order. In another example, the profile may include pre-assigned user name, password, etc. that are matched to those of a check ordering account held at a check ordering service and associated with the checking account. Once matched, the user is identified as, or considered to be authorized by, the account holder of the checking account (i.e., the payer of the check) to authenticate the order. In one or more embodiments, the authentication information retrieved from the profile is sent to the check ordering service for authentication when submitting the order. In one or more embodiments, the authentication information retrieved from the profile is evaluated by the check ordering software application installed on the mobile device to authenticate the order prior to submitting to the check ordering service.

In one or more embodiments, the request to order the new set of paper checks is authenticated based on a current location of the user as determined by a GPS device within the mobile device. For example, the order of the new set of paper checks is restricted to be submitted within a same geographical location (e.g., same city, county, state, country, etc.) as the account holder's address of the checking account. In one or more embodiments, the current location provided by the GPS device is compared to the address information extracted from the check image to authenticate the order.

For security purposes, the order may be qualified by requiring that the check image is captured from a particular type of check. In one or more embodiments, the order is further qualified based on the determination that the check image is captured from an unused check. In other embodiments, the order may be qualified based on the determination that the check image is captured from a voided check. For example, the message presented to the user in Step 202 instructing the user to locate the existing check for image capturing may specify that such check needs to be an unused check (whether voided or not), a voided check (whether unused or not), an unused and voided check, or other suitable conditions. Example methods to determine the check image as corresponding to an unused check, an executed check, or a voided check are described in reference to the check image analyzer (124) shown in FIG. 1 above.

In Step 207, the order of the new set of checks is submitted to a check ordering service. In one or more embodiments, a database is searched to identify a suitable check ordering service. For example, the financial institution with which the checking account is held may be identified based on the account number and the address of the account holder retrieved from the check image. Accordingly, the check ordering service associated with (e.g., contracted with or otherwise authorized by) the identified financial institution is selected from the database. In another example, a local (e.g., in the same city, county, state, country, etc.) check ordering service may be selected from the database based on a current location of the user, as determined by the GPS device in the mobile device, to minimize the shipping cost.

FIGS. 3A-3G show an application example in accordance with one or more embodiments of the invention. This example application may be practiced using the system (100) of FIG. 1 and based on the method described with respect to FIG. 2 above.

The example depicted in FIGS. 3A-3G is related to a scenario including (i) a user John uses his mobile device (e.g., smartphone) to take a photo of a his check, (ii) a mobile application "SnapCheck" installed on the mobile device parses the image, extracts imprint text, bank information, and other information required for check customization from the image, (iii) John is asked to input next check start number and click submit button, and (iv) check order is placed by the mobile application with no data entry except entering next check start number, and quantity (i.e., number of checks in the order). In this example scenario, the ship-to address and payment information for the order are identified from the same check provided by John. Further, the shipment recipient is John, the account holder (i.e., check payer) as identified based on unique combination of bank account number and imprint text extracted from the check image.

Figure 3A:
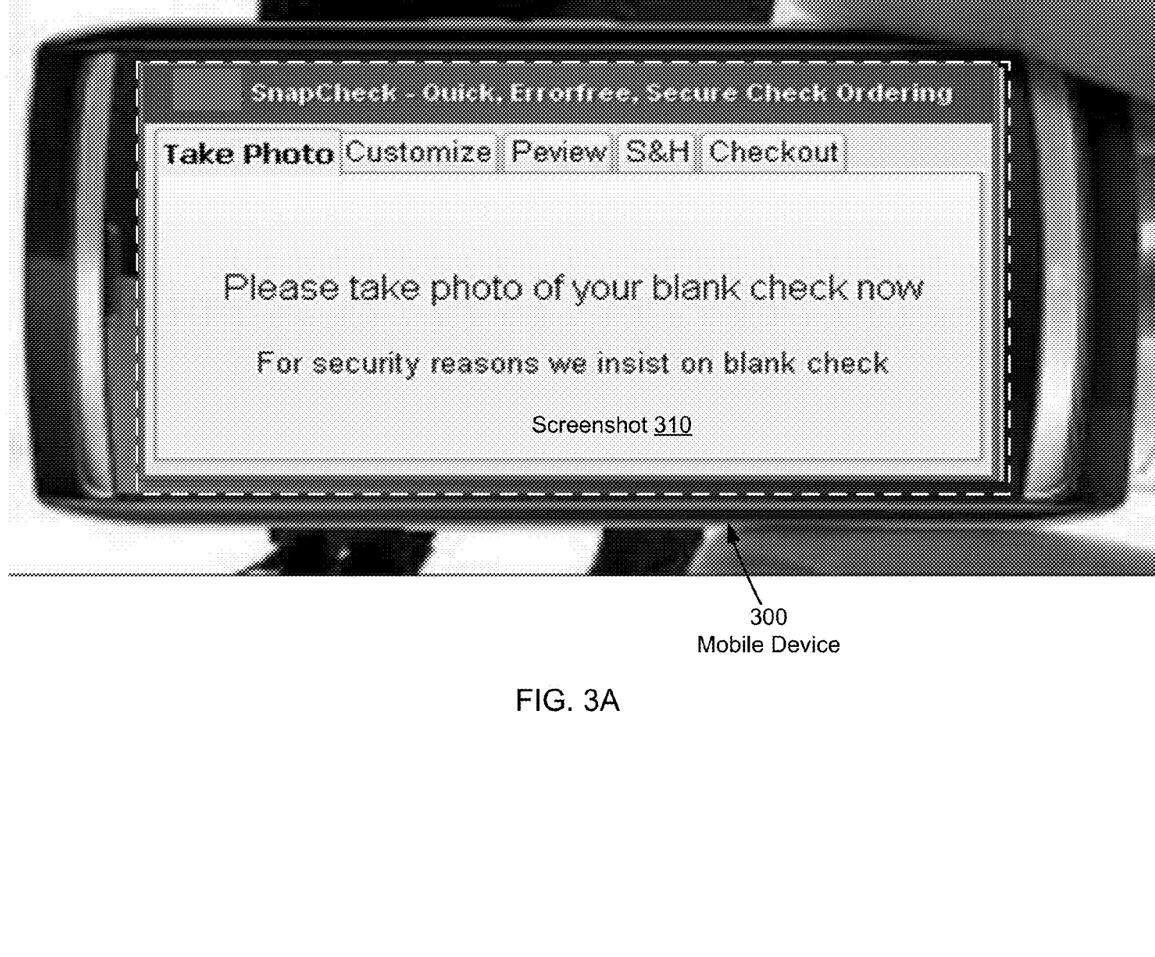
FIGS. 3A-3G show an example of ordering checks using a mobile device in accordance in accordance with one or more embodiments of the invention.

FIG. 3A shows a screenshot (310) displayed on a mobile device (300) on which John has previously download the SnapCheck application. Specifically, launching the SnapCheck on the mobile device (300) is recognized as a request to generate and place an order for a new set of paper checks. Accordingly, the screenshot (310) shows a visual prompt displayed by the SnapCheck to instruct John to take a picture of his blank check.

Figure 3B:
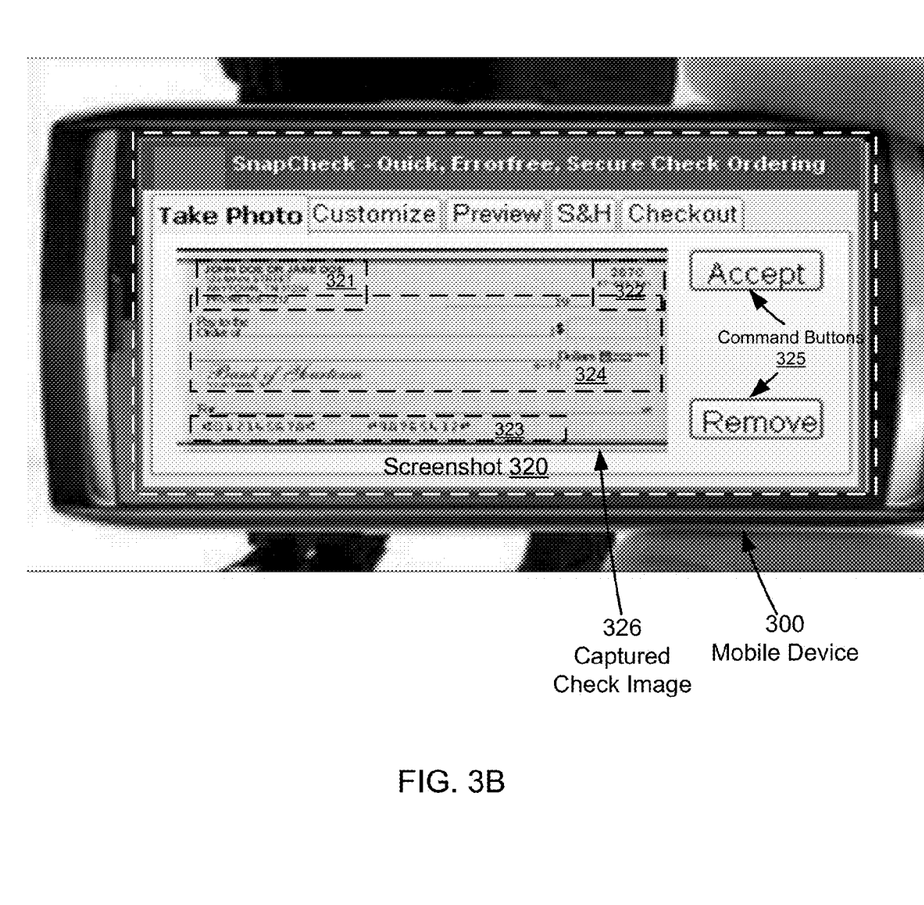

FIG. 3B shows a screenshot (320) on the mobile device (300) after John has taken a picture of his blank check. In particular, the screenshot (320) includes the captured check image (326) and command buttons (325). As shown, the captured check image (326) includes field (321)-(324) containing image data corresponding to various portions of imprinting on John's blank check. Specifically, field (321) corresponds to John's name, mailing address, and phone number, field (322) corresponds to a check number, field (324) corresponds to a template order to pay, and field (323) corresponds to a bank routing number and an account number. Further, the template order to pay includes the name of the bank with which John holds the checking account of his checks.

In addition, command buttons (325) are used to accept or remove the captured check image (326), for example based on clarity. Once accepted, SnapCheck extracts account information, for example contained in fields (321)-(324), from the captured check image (326). Further, SnapCheck may also extract other information representing various characteristics of the captured check image (326), such as background pattern, imprinting color, etc.

Figure 3C:
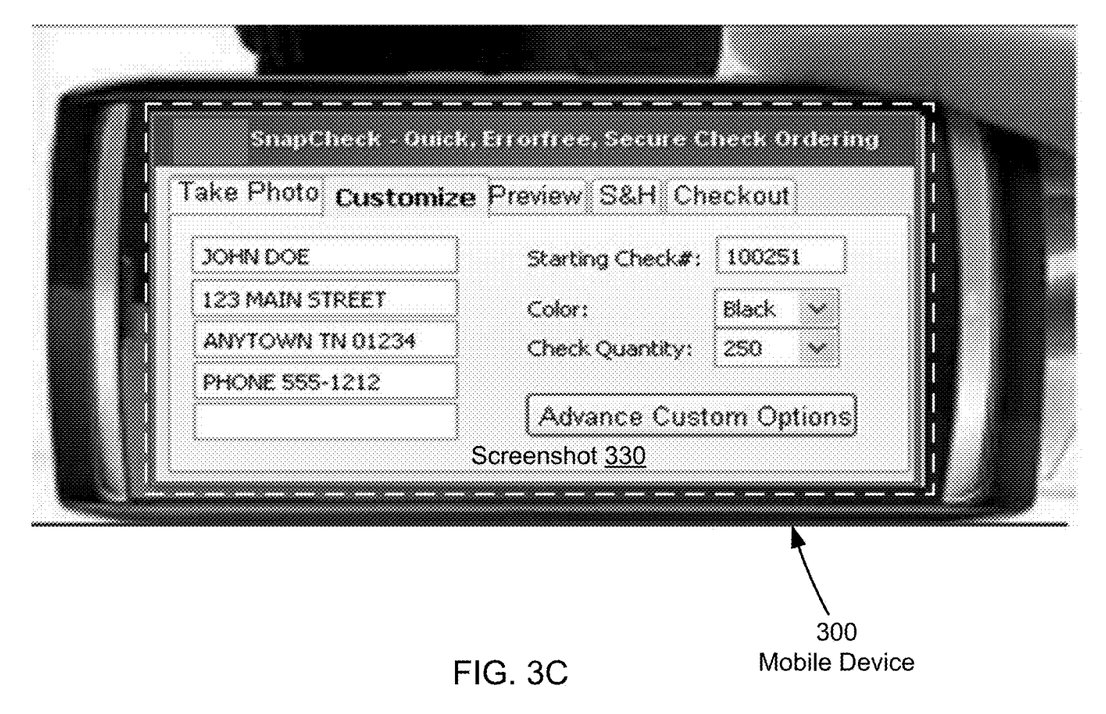

FIG. 3C shows a screenshot (330) on the mobile device (300) after John has accepted the captured check image (326) and SnapCheck has extracted the account information. In particular, the screenshot (330) depicts a customization menu allowing John to modify various information, captured by SnapCheck from the captured check image (326), to generate specification of the new checks specifying the imprinting on the new checks and order quantity. As shown, the customization menu includes various fields prefilled with account holder's name, address, phone number, and imprinting color that are extracted from the captured check image (326). In addition, the customization menu includes fields requiring new inputs from John, such as starting check number and check quantity. Further, the customization menu includes an advanced custom options button for accessing additional custom modification options.

In response to viewing the screenshot (330), John may make appropriate changes (e.g., adding a joint account holder name, updating address or phone number, etc.) and enter starting check number and quantity. Once all changes and/or new inputs are entered using the customization menu, the final check data is validated by SnapCheck with respect to pre-determined check specifications. In the example scenario, the order must be placed from the location specified by the address on the captured check image (326) for security reason. For example, John's current location is obtained by GPS on his mobile device and compared to the address on the captured check image (326) by SnapCheck to qualify the order based on a match. In another example, the phone number of John's mobile device (300) may be compared to the phone number on the captured check image (326) by SnapCheck to qualify the order based on a match.

Figure 3D:
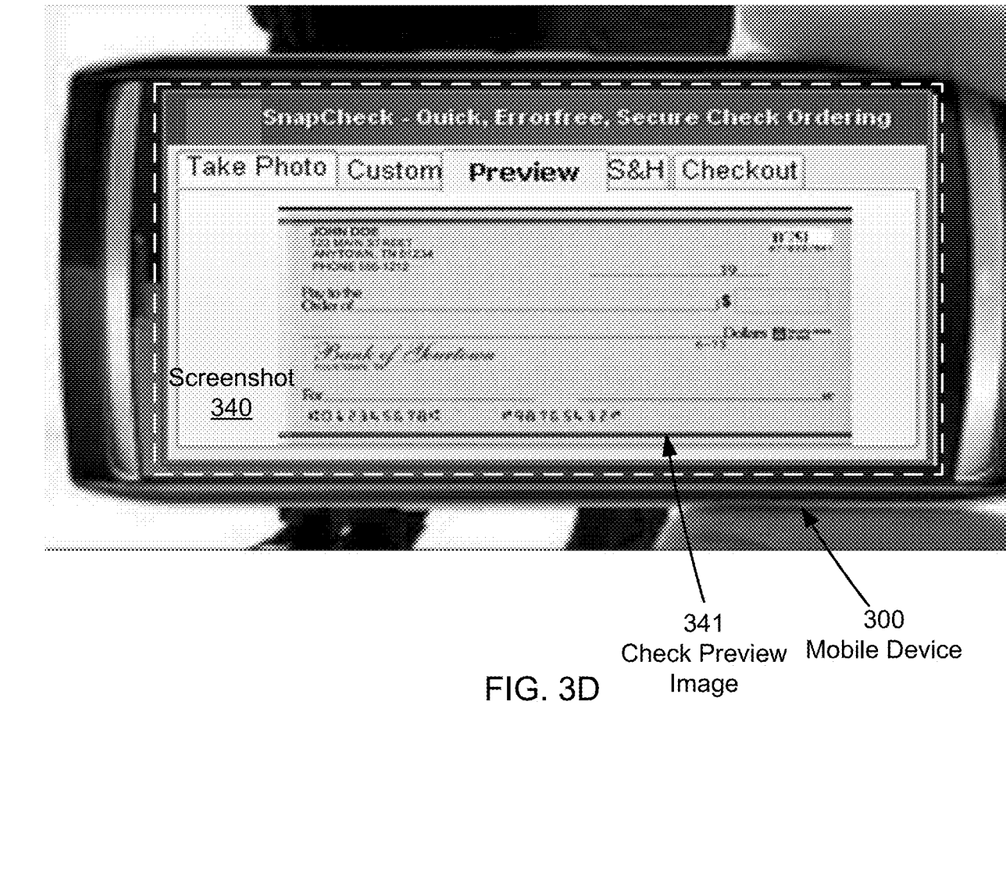

FIG. 3D shows a screenshot (340) on the mobile device (300) after John's order for the new set of paper checks has been validated and accepted by SnapCheck. In particular, the screenshot (340) shows a check preview image (341), which is a mock up of one of the new set of paper checks. The check preview image (341) allows John to double check all imprinted information specified by the order prior to the order being submitted to the check ordering service. John is allowed to go back to screenshot (330) shown in FIG. 3C to make any last minute correction or change before approving the check preview image (341) and proceeding to finalizing shipping details shown in FIG. 3E.

Figure 3E:
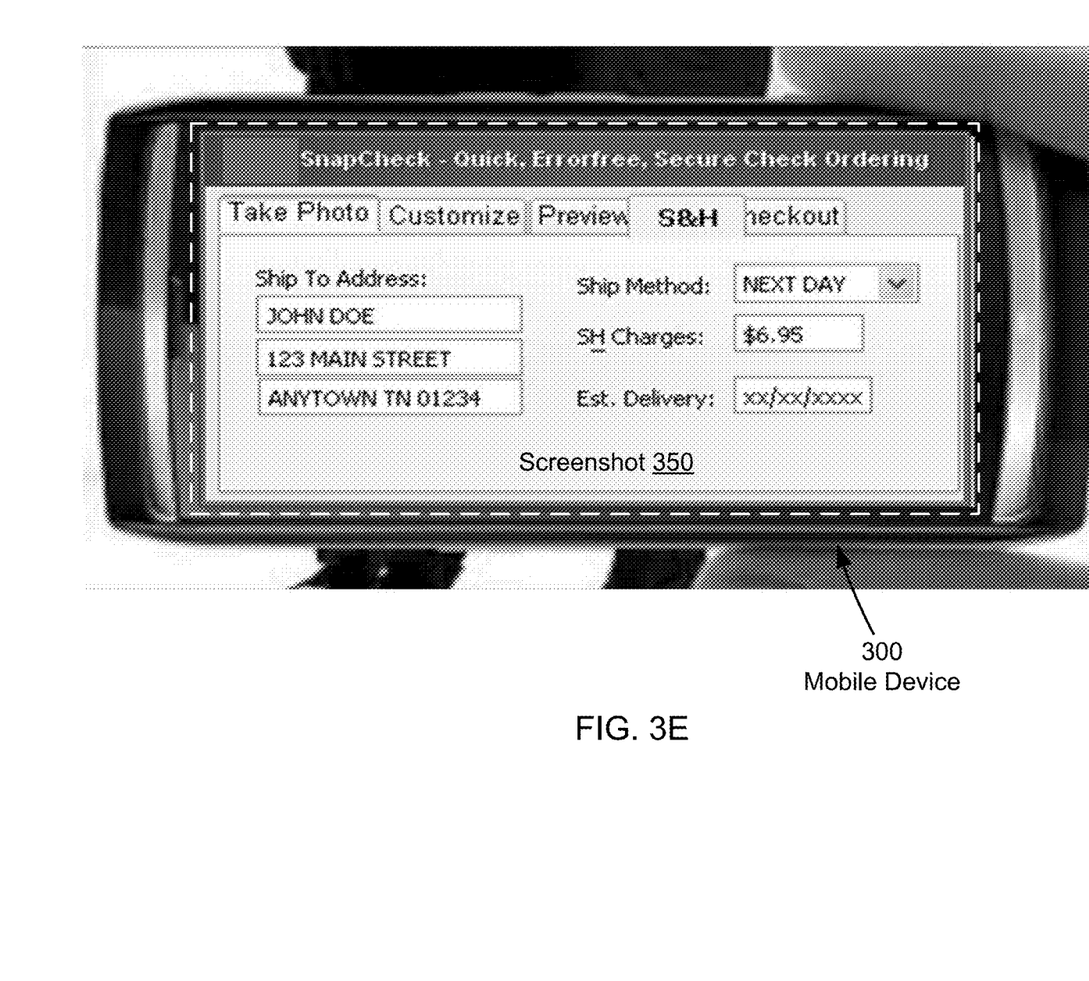

FIG. 3E shows a screenshot (350) on the mobile device (300) after John approves the check preview image (341). In particular, the screenshot (350) shows a shipping information menu allowing John to review ship-to address and specify shipping method. In the example scenario, the ship-to address must be the same as address on the captured check image (326) for security reasons. In addition, the shipping information menu also provides estimated shipping charge and delivery date for John's reference.

Figure 3F:
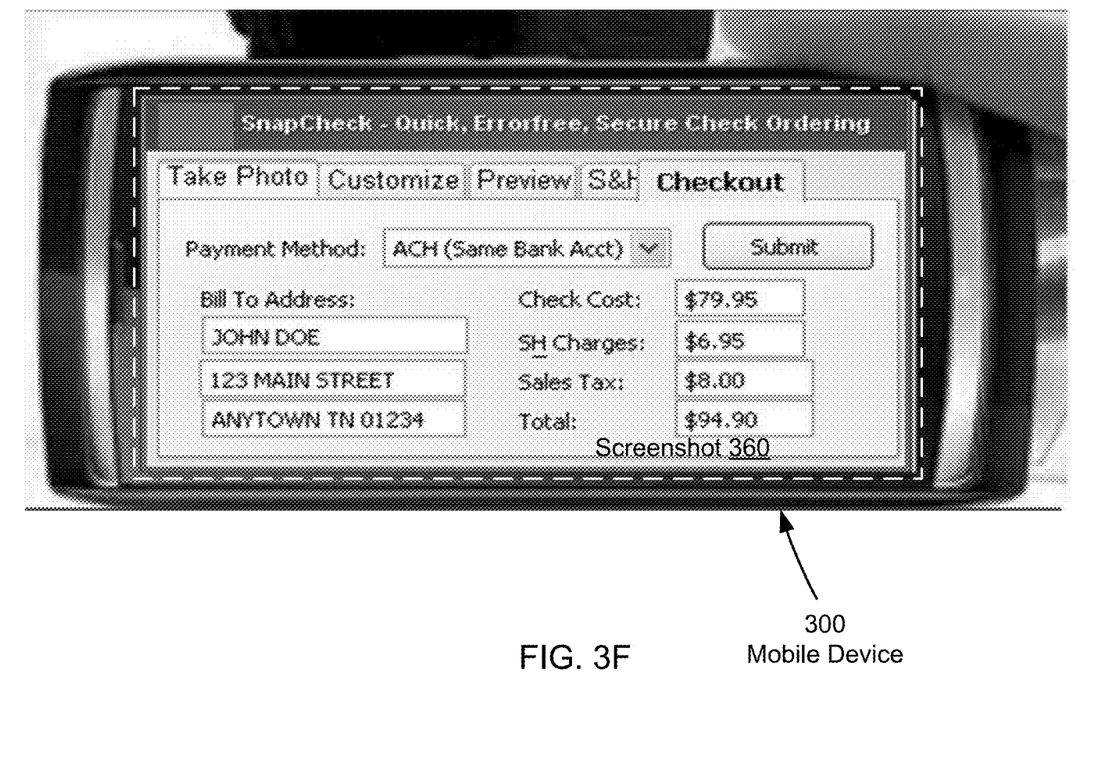

FIG. 3F shows a screenshot (360) on the mobile device (300) after John completes the shipping details and proceeds to the final checkout. In particular, the screenshot (360) shows a checkout menu allowing John to confirm payment method, bill-to address, and review payment amount of the order. In the example scenario, payment method is defaulted to ACH (automated clearing house) transaction using the same bank account number and routing number as in the new checks that are being ordered. Once confirmed, John submits the order using the submit action button on the checkout menu. Accordingly, order information is released to the check ordering service to initiate the order fulfillment process, which may involves potential fraud screening procedures.

Figure 3G:
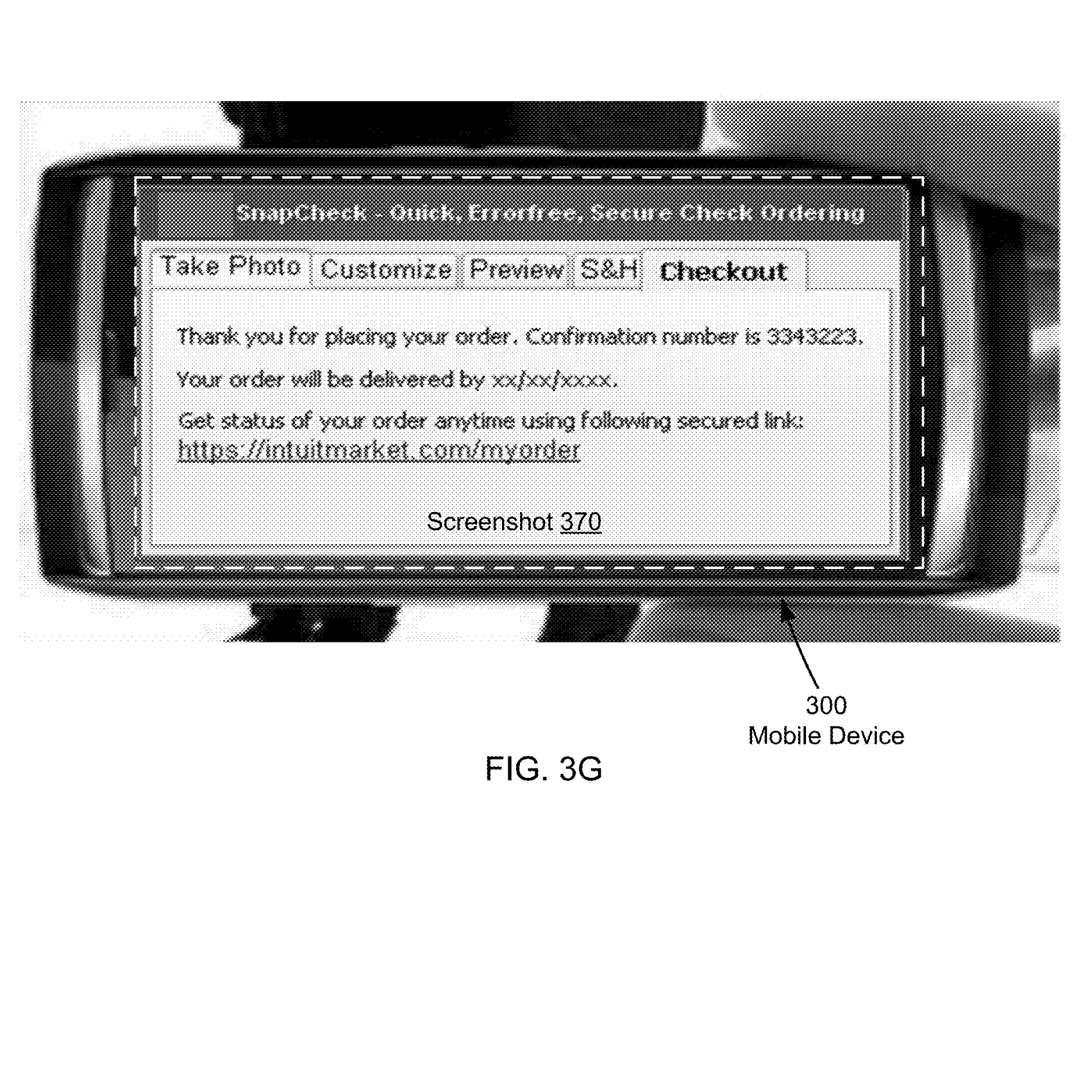

FIG. 3G shows a screenshot (370) on the mobile device (300) after John submits the order using the checkout menu. In particular, the screenshot (370) shows an order confirmation message and tracking information for John's order.

Accordingly, John receives the ordered new set of paper checks in the mail some time later.

Although various embodiments described above use the camera of the mobile device to capture the image of an existing paper check, those skilled in the art with the benefit of this disclosure will appreciate that a variation of the method may also be applicable to order new checks based on the check image of an electronic check, either obtained digitally from a file or optically from a displayed or printed electronic check. For example, as controlled by the check ordering software, a smartphone or other mobile devices may prompt the user to aim a camera of the smartphone toward a check and process the check image appearing in the camera view finder directly, i.e., without requiring the user to actually take a photograph.

Figure 4:
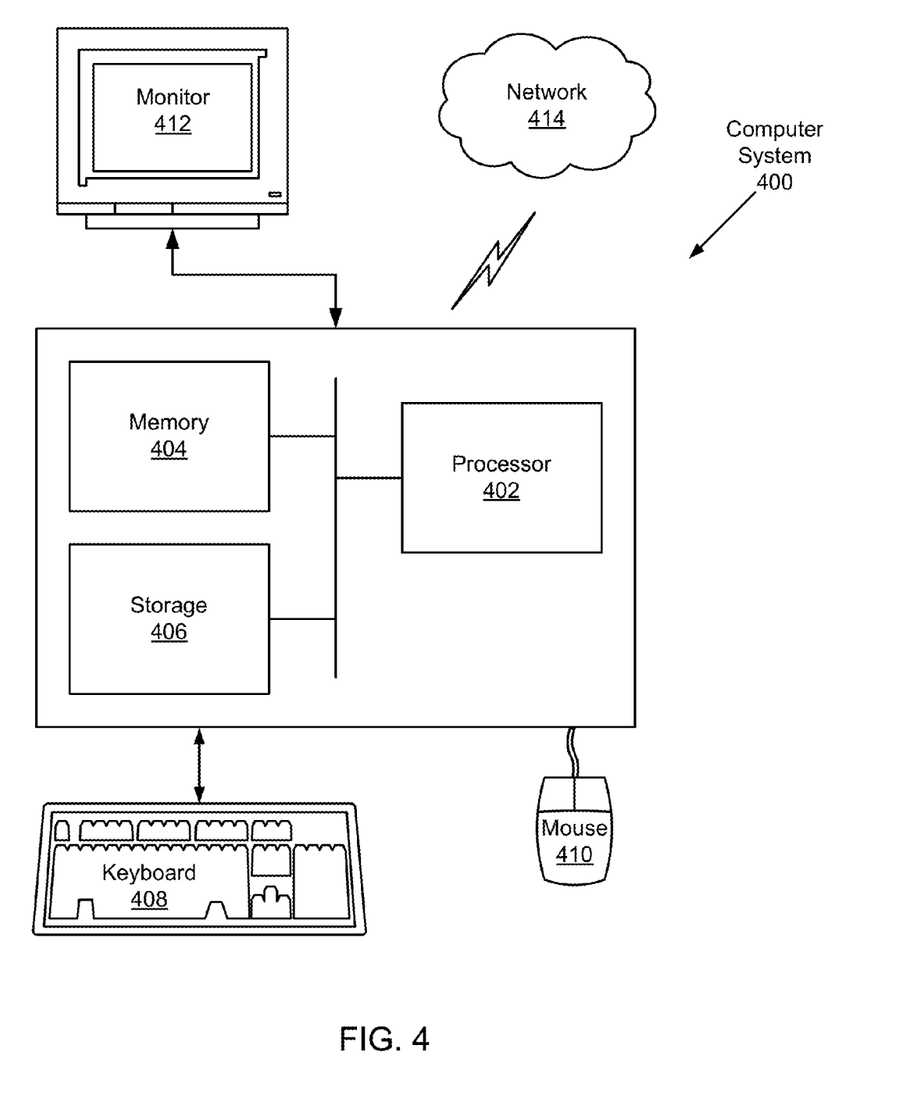
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to authenticate a request for a set of paper checks using a smartphone, comprising:

obtaining, using the smartphone, an image of a check;

analyzing, using a computer processor of the smartphone and based on a pre-determined check template, the image to identify account information of the check, wherein the account information relates to a checking account of an account holder at a financial institution issuing the check;

extracting, using the computer processor, the account information comprising a checking account number, a name of the account holder, and an address of the account holder from the image;

determining, using a global positioning system (GPS) of the smartphone, a current location of a user of the smartphone;

authenticating the request by comparing the address of the account holder and the current location of the user of the smartphone;

searching, using the computer processor and in response to authentication of the request, a database to identify a check ordering service based on the account number and the address of the account holder; and submitting to the check ordering service, using the smartphone, an order of the set of paper checks for the account holder based on the account information of the account holder.

2. The method of claim 1, further comprising:

determining that the check is unused based on analyzing the image of the check, wherein submitting the order is in response to determining that the check is unused.

3. The method of claim 1, further comprising:

receiving the request from the user to initiate the order of the set of paper checks; and presenting, using the smartphone, a message prompting the user to capture the image of the check using a camera of the smartphone.

4. The method of claim 3, further comprising:

retrieving, in the smartphone, authentication information from a profile of the user;

sending the authentication information to the check ordering service when submitting the order, wherein the check ordering service validates the authentication information prior to processing the order.

5. The method of claim 3, further comprising:

retrieving, in the smartphone, a ship-to address from a profile of the user;

wherein the order comprises the ship-to address for delivering the set of paper checks.

6. The method of claim 1, wherein the obtaining, analyzing, searching, and submitting are performed by a software application executing on the computer processor of the smartphone.

7. The method of claim 1, further comprising:

retrieving the address from the account information of the check, wherein the order comprises the address as the ship-to address for delivering the set of paper checks.

8. The method of claim 1, further comprising:

receiving a ship-to address from the user, wherein the order comprises the ship-to address for delivering the set of paper checks.

9. A system to authenticate a request for a set of paper checks, comprising:

a server of a check ordering service configured to process an order of the set of paper checks; and a smartphone coupled to the server of the check ordering service server via a mobile network, the smartphone comprising:
  a camera configured to capture an image of a check;
  a processor and memory storing instructions, the instructions when executed by the processor comprising functionalities to:
    analyze the image to identify account information of the check based on a pre-determined check template, wherein the account information relates to a checking account of an account holder at a financial institution issuing the check;
    extract the account information comprising a checking account number, a name of the account holder, and an address of the account holder from the image;
    determine, using a global positioning system (GPS) of the smartphone, a current location of a user of the smartphone;
    authenticate the request by comparing the address of the account holder and the current location of the user of the smartphone;
    search, in response to authentication of the request, a database to identify the check ordering service based on the account number and the address of the account holder; and
    submit, to the server of the check ordering service, an order of the set of checks for the account holder based on the account information of the account holder; and
  a repository configured to store the image of the check.

10. The system of claim 9, the instructions when executed by the processor further comprising functionalities to:
  determine that the check is unused based on analyzing the image of the check,
  wherein submitting the order is in response to determining that the check is unused.

11. The system of claim 9, the instructions when executed by the processor further comprising functionalities to:
  receive the request from the user to initiate the order of the set of checks;
  present, using the smartphone, a message prompting the user to capture the image of the check using a camera of the smartphone.

12. The system of claim 11,
  the repository further configured to store a profile of the user,
  the instructions when executed by the processor further comprising functionalities to:
    retrieve authentication information from the profile; and
    send the authentication information to the server of the check ordering service when submitting the order,
  the server of the check ordering service further configured to validate the authentication information prior to processing the order.

13. The system of claim 11, the instructions when executed by the processor further comprising functionalities to:
  retrieve, in the repository, a ship-to address from a profile of the user;
  wherein the order comprises the ship-to address for delivering the set of paper checks.

14. The system of claim 9, the instructions when executed by the processor further comprising functionalities to:
  retrieve the address from the account information of the check,
  wherein the order comprises using the address as the ship-to address for delivering the set of paper checks.

15. The system of claim 9, the instructions when executed by the processor further comprising functionalities to:
  receive a ship-to address from the user,
  wherein the order comprises the ship-to address for delivering the set of paper checks.

16. A non-transitory computer readable medium storing instructions to authenticate a request for a set of checks, the instructions, when executed by a computer processor of a smartphone, comprising functionality to:
  obtain, using a camera of the smartphone, an image of a check;
  analyze, based on a pre-determined check template, the image to identify account information of the check, wherein the account information relates to a checking account of an account holder at a financial institution issuing the check;
  extract, using the computer processor, the account information comprising a checking account number, a name of the account holder, and an address of the account holder from the image;
  determine, using a global positioning system (GPS) of the smartphone, a current location of a user of the smartphone;
  authenticate the request by comparing the address of the account holder and the current location of the user of the smartphone;
  search, in response to authentication of the request, a database to identify a check ordering service based on the account number and the address of the account holder; and
  submit, to the check ordering service, an order of the set of paper checks for the account holder based on the account information of the account holder.

17. The non-transitory computer readable medium of claim 16, the instructions, when executed by the computer processor of a smartphone, further comprising functionality to:
  determine that the check is unused based on analyzing the image of the check,
  wherein submitting the order is in response to determining that the check is unused.

18. The non-transitory computer readable medium of claim 16, the instructions, when executed by the computer processor of a smartphone, further comprising functionality to:
  receive the request from the user to initiate the order of the set of paper checks; and
  present a message prompting the user to capture the image of the check using a camera of the smartphone.

19. The non-transitory computer readable medium of claim 18, the instructions, when executed by the computer processor of a smartphone, further comprising functionality to:
  retrieve, in the smartphone, authentication information from a profile of the user;
  send the authentication information to the check ordering service when submitting the order,
  wherein the check ordering service validates the authentication information prior to processing the order.

20. The non-transitory computer readable medium of claim 18, the instructions when executed by the processor further comprising functionalities to:
  retrieve, in the smartphone, a ship-to address from a profile of the user;
  wherein the order comprises the ship-to address for delivering the set of paper checks.

21. The non-transitory computer readable medium of claim 16, the instructions, when executed by the computer processor of a smartphone, further comprising functionality to:

retrieve the address from the account information of the check, wherein the order comprises the address as the ship-to address for delivering the set of paper checks.

22. The non-transitory computer readable medium of claim 16, the instructions when executed by the processor further comprising functionalities to:

receive a ship-to address from the user, wherein the order comprises the ship-to address for delivering the set of paper checks.

* * * * *